US009151627B2

(12) United States Patent
Bailiang et al.

(10) Patent No.: US 9,151,627 B2
(45) Date of Patent: Oct. 6, 2015

(54) NAVIGATION DIRECTIONS BETWEEN AUTOMATICALLY DETERMINED STARTING POINTS AND SELECTED DESTINATIONS

(71) Applicant: GOOGLE INC., Mountain View, CA (US)

(72) Inventors: Zhou Bailiang, Balgowlah (AU); Judith Shade, Tokyo (JP)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/196,638

(22) Filed: Mar. 4, 2014

(65) Prior Publication Data

US 2015/0253143 A1    Sep. 10, 2015

(51) Int. Cl.
*G01C 21/34* (2006.01)
*G01C 21/00* (2006.01)
*G01C 21/26* (2006.01)

(52) U.S. Cl.
CPC ............... *G01C 21/34* (2013.01); *G01C 21/00* (2013.01); *G01C 21/26* (2013.01)

(58) Field of Classification Search
CPC ......... G01C 21/00; G01C 21/26; G01C 21/34
USPC ........................................................ 701/527
See application file for complete search history.

(56) References Cited

U.S. PATENT DOCUMENTS

| | | | |
|---|---|---|---|
| 5,486,822 A | 1/1996 | Tenmoku et al. | |
| 5,608,635 A * | 3/1997 | Tamai | 701/428 |
| 6,049,753 A | 4/2000 | Nimura | |
| 6,148,261 A * | 11/2000 | Obradovich et al. | 701/438 |
| 6,845,316 B2 | 1/2005 | Yates | |
| 8,321,126 B2 | 11/2012 | Mays | |
| 8,335,647 B2 | 12/2012 | Kurtti et al. | |
| 8,437,778 B1 | 5/2013 | Ortega et al. | |
| 8,457,682 B2 | 6/2013 | Raab | |
| 8,630,800 B1 | 1/2014 | Connolly et al. | |
| 8,688,377 B1 * | 4/2014 | Urbach et al. | 701/522 |
| 2001/0041961 A1 | 11/2001 | Feigen | |
| 2003/0055558 A1 | 3/2003 | Watanabe et al. | |
| 2005/0071078 A1 | 3/2005 | Yamada et al. | |

(Continued)

FOREIGN PATENT DOCUMENTS

EP      1 993 075 A1    11/2008

OTHER PUBLICATIONS

"Trip Planning," (2013). Retrieved from the Internet on Nov. 18, 2013: <URL:http://tripplanner2.kingcounty.gov/>.

(Continued)

*Primary Examiner* — Mary Cheung
*Assistant Examiner* — Michael Berns
(74) *Attorney, Agent, or Firm* — Marshall, Gerstein & Borun LLP (57) ABSTRACT

To provide navigation directions in mapping applications, an indication of a geographic location and an indication of a map viewport that includes the geographic location are received. Several candidate starting points from which people are more likely to access the geographic location than from other locations within the map viewport are identified. A starting point is selected from among the several candidate starting points, and navigation directions for guiding a user of the user device from the starting point toward the geographic location are generated for display on the user device.

20 Claims, 6 Drawing Sheets

(56) References Cited

U.S. PATENT DOCUMENTS

| | | | |
|---|---|---|---|
| 2005/0192742 | A1 | 9/2005 | Okochi |
| 2005/0283311 | A1 | 12/2005 | Ohler |
| 2007/0005235 | A1 | 1/2007 | Suzuki et al. |
| 2007/0010942 | A1 | 1/2007 | Bill |
| 2007/0265770 | A1* | 11/2007 | Hirose .................. 701/202 |
| 2009/0112465 | A1 | 4/2009 | Weiss et al. |
| 2009/0281726 | A1 | 11/2009 | Byrne et al. |
| 2009/0319166 | A1 | 12/2009 | Khosravy et al. |
| 2010/0106603 | A1 | 4/2010 | Dey et al. |
| 2010/0312466 | A1 | 12/2010 | Katzer et al. |
| 2010/0332130 | A1 | 12/2010 | Shimizu et al. |
| 2011/0145290 | A1 | 6/2011 | Fujii et al. |
| 2011/0172908 | A1 | 7/2011 | Singh |
| 2011/0208429 | A1 | 8/2011 | Zheng et al. |
| 2011/0257877 | A1* | 10/2011 | Liu et al. ................ 701/201 |
| 2013/0122937 | A1 | 5/2013 | Meyer et al. |
| 2013/0179070 | A1 | 7/2013 | Kristinsson et al. |

OTHER PUBLICATIONS

Abruzzo et al., "Models" 306090 Books vol. 11, p. 234-235 (2007).

basicin, "Wedding Etiquette and Tips: Direction Card, Map Card Wording," (2013). Retrieved from the Internet on Jul. 29, 2013: URL:http://www.basicinvite.com/wedding-etiquette/direction-card-and-map-card-wording.

Office Action for U.S. Appl. No. 13/931,718, issued Feb. 3, 2014.

Office Action for U.S. Appl. No. 13/895,043, issued Jan. 14, 2014.

Office Action for U.S. Appl. No. 13/931,718, issued Sep. 5, 2013.

PCMAG.com, "TomTom (for iPhone)," (2013). Retrieved from the Internet on Nov. 18, 2013: URL:http://www.pcmag.com/article2/0,2817,2388770,00.asp.

U.S. Appl. No. 13/929,582, filed Jun. 27, 2013.

U.S. Appl. No. 13/931,710, filed Jun. 28, 2013.

U.S. Appl. No. 13/931,718, filed Jun. 28, 2013.

U.S. Appl. No. 14/066,286, filed Oct. 29, 2013.

U.S. Appl. No. 14/066,304, filed Oct. 29, 2013.

U.S. Appl. No. 14/066,335, filed Oct. 29, 2013.

"European Patent Office Munich—Isar Building—Getting There" Retrieved from the Internet on May 18, 2015: URL:http://web.archive.orct/web120130311022238/http://www.epo.org/service-support/contact-us/munich/isar.html.

International Search Report and Written Opinion for Application No. PCT/US2015/018569, dated Jun. 2, 2015.

\* cited by examiner

NAVIGATION DIRECTIONS BETWEEN AUTOMATICALLY DETERMINED STARTING POINTS AND SELECTED DESTINATIONS

FIELD OF THE DISCLOSURE

The present disclosure relates to digital mapping data and, more particularly, to providing navigation directions to a user without receiving a selection of the starting point for the navigation directions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many users request map and navigation data for various geographic locations. Software applications typically generate navigation data in response to receiving input from a user, specifying the starting point and the destination.

SUMMARY

A system implemented in a network server and/or a user device automatically provides navigation directions to a user to a certain geographic location without receiving a selection of the starting point for the navigation directions. A user selects the geographic location on a digital map within a viewport manually or automatically (e.g., by submitting a geographic query). The geographic location defines the destination for navigation directions. The system then automatically selects a starting point for these navigation directions by identifying geographic locations within the same map viewport that are likely to be the user's starting point. For example, the system can identify transportation hubs, popular points of interests (POIs), exits from major roads, etc. The system also can rank the geographic locations according to such factors as popularity, accessibility associated with the likely mode of transportation to the geographic location (e.g., an airport is less accessible than a highway exit, because an airport most likely requires a plane whereas a highway exit most likely requires a car), distance from the destination, etc. The system then can select one or several top ranking starting points and generate navigation directions for guiding the user from these starting points to the destination. The user device can automatically generate a visualization of these navigation directions.

In this manner, the system can determine a likely starting point and generate navigation directions for a user who is unfamiliar with the area and does not know what the starting point will be. Moreover, this technique can be used by a merchant website or another third-party website which includes an indication of the merchant location on a map. Without knowing the locations of the users who view the map, the system can provide the users directions from likely starting points based on the viewport of the map.

In particular, an example embodiment of the techniques of the present disclosure is a method for providing navigation directions in mapping applications. The method includes receiving an indication of a geographic location, receiving an indication of a map viewport on a user device that includes the geographic location, identifying several candidate starting points from which people are more likely to access the geographic location than from other locations within the map viewport, selecting a starting point from among the several candidate starting points, and generating navigation directions for guiding a user of the user device from the starting point toward the geographic location, for display on the user device. The method can be executed on one or more computing devices.

Another embodiment of these techniques is a method in a client device for automatically receiving navigation directions. The method includes displaying a digital map within a current map viewport via a user interface, determining a geographic location within the current map viewport, transmitting an indication of the geographic location and indication of the current map viewport to a network server via a communication network, receiving (i) an indication of a starting point within the viewport, automatically selected by the network server as a place from which users are more likely to access the geographic location, and (ii) navigation directions for traveling from the starting point toward the geographic location, and providing a visualization of the navigation direction via the user interface.

Yet another embodiment of these techniques is a client computing device including a communication interface, user interface, one or more processors coupled to the communication interface and the user interface, and a non-transitory computer-readable medium storing instructions. When executed by the one or more processors, the instructions cause the client computing device to (i) display a digital map within a current map viewport via the user interface, (ii) receive a selection of a geographic location within the current map viewport, (iii) transmit an indication of the geographic location and indication of the current map viewport to a network server via the communication interface, receive, from the network server, (a) an indication of a starting point within the viewport, automatically selected by the network server as a place from which users are more likely to access the geographic location, and (b) navigation directions for traveling from the starting point toward the geographic location, and provide a visualization of the navigation direction via the user interface.

DETAILED DESCRIPTION

Generally speaking, the techniques for providing navigation directions without specifying a starting point can be implemented in a client computing device, one or several network servers or a system that includes a combination of these devices. However, for clarity, the examples below focus primarily on an embodiment in which a mapping application executes on a user device and specifies a geographic location corresponding to a destination, a map data server determines one or more starting points using a starting point scoring engine, a navigation server generates navigation directions from one or more starting points to a destination, and the user device displays map content and the navigation directions.

In one implementation, the user device generates a request for navigation directions for a destination within a map viewport, and a starting point scoring engine receives the request. The starting point scoring engine identifies several geographic locations within the viewport and ranks the geographic locations based on several factors for determining the likelihood that a geographic location will be a user's starting point. After ranking the geographic locations, the starting point scoring engine first selects the highest ranking location as the starting point and may select more geographic locations in descending order depending on how many starting points the user device requests. Once the starting point(s) is/are determined, the system determines a mode of transportation for the user and generates navigation directions from the starting point(s) to the destination according to the mode of transportation.

For example, if the user selects Willis Tower in Chicago, Ill., with the map viewport showing locations predominantly northwest of Willis Tower and at a "moderate" zoom level (at which the map viewport is approximately ten city blocks wide), the system may determine that one possible starting point is Highway 94. On the other hand, if the user selects Willis Tower at the same moderate zoom level but the viewport shows locations predominantly south of Willis Tower, the system may determine an starting point is Highway 290. However, if the user selects Willis Tower but the zoom level is so low that the map viewport includes the entire metropolitan area, the system may determine that the starting points are locations at O'Hare and Midway airports.

In other implementations, the techniques for determining the one or more starting points and generating the navigation directions can be implemented on the client computing device.

Example Hardware and Software Components

Figure 1:
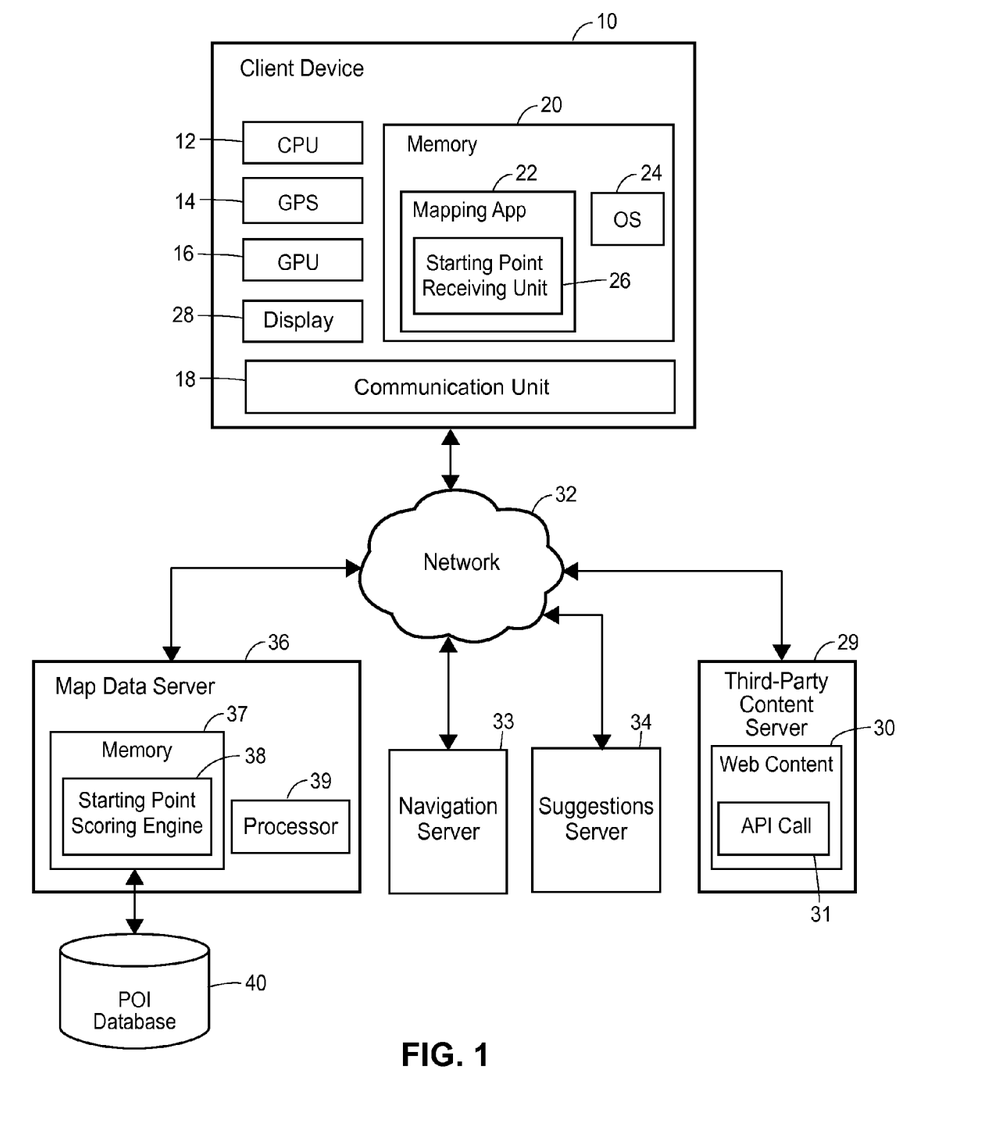
FIG. 1 illustrates a block diagram of an example communication system in which techniques for providing navigation directions without specifying an starting point can be implemented.

Referring to FIG. 1, an example communication system in which the techniques outlined above can be implemented includes a client computing device 10 (also referred to herein as a "client device"). The client device 10 may be a portable device such as smart phone or a tablet computer, for example. The client device 10 may also be a laptop computer, a desktop computer, or a personal digital assistant (PDA). The client device 10 also can communicate with various content providers, servers, etc. via a wired or wireless communication network 32 such as a fourth- or third-generation cellular network (4G or 3G, respectively). The client device 10 can include a display 28 such as a touchscreen. The display may include a software keyboard for entering text input. Additionally, the client device 10 includes a graphics processing unit (GPU) 16, one or more processors or CPUs 12, a GPS module 14, a memory 20, and a cellular communication unit 18 to transmit and receive data via a 3G cellular network, a 4G cellular network, or any other suitable network.

The memory 20 can store, for example, instructions of an operating system 24, and a starting point receiving unit 26 as part of a mapping application 22 that invokes a mapping API during operation. The starting point receiving unit 26 can determine a geographic location specified by the user corresponding to a destination, and transmit the destination to a starting point scoring engine 38. Further, the starting point receiving unit 26 can receive navigation directions from the starting point scoring engine 38.

The software components 22, 24, and 26 can include compiled instructions and/or instructions in any suitable programming language interpretable at runtime. In any case, the software components 22, 24, and 26 execute on the one or more processors 12.

The mapping application 22 generally can be provided in different versions for different respective operating systems. For example, the maker of the client device 10 can provide a Software Development Kit (SDK) including the mapping application 22 for the Android™ platform, another SDK for the iOS™ platform, etc.

The client device 10 has access to a wide area communication network 32 such as the Internet via a long-range wireless communication link (e.g., a cellular link). The client device 10 can access the communication network 30 via a cellular communication unit 18. In the example configuration of FIG. 1, the client device 10 communicates with a navigation server 32 that provides navigation data and a map data server 36 which generates map data (e.g., in a vector graphics format).

A third-party content server 29 can provide web content 30 including an embedded digital map to the client 10. In particular, the web content 30 can include a call 31 to a mapping API, via which the third-party content server 29 can specify a geographic location and a viewport. In an example scenario, the web content 30 describes a brick-and-mortar business at a certain geographic location. The operator of the business wishes to embed a relatively small digital map in its website to show this geographic location to potential customers. The operator of course does not know where these potential customers may be coming from. Also, there may not be sufficient screen real estate to display UI elements for searching and/or invoking directions. In other words, it is impractical for the operator to attempt to provide a robust interface using which visitors to the web site can specify the places from which they may be arriving at the geographic location. Accordingly, the operator relies on the map data server 36 to automatically detect starting points and provide navigation directions to the geographic location, for display over (or with) the embedded digital map.

In some implementations, the map data server 36 includes a memory 37 and one or more processors 39. The memory 37 may be tangible, non-transitory memory and may include any types of suitable memory modules, including random access memory (RAM), read-only memory (ROM), flash memory, other types of persistent memory, etc. The memory 37 stores instructions executable on the processors 39 that make up a starting point scoring engine 38 which identifies one or more geographic locations in a viewport and determines one or more starting points for navigation directions.

To determine the one or more starting points, the starting point scoring engine 38 receives information related to the likelihood that a geographic location or point of interest (POI) will be the user's starting point from a POI database 40. For example, this information may include popularity data. Once the one or more starting points are determined, the starting point scoring engine 38 may call upon the navigation server 32 to provide navigation directions, and the starting point scoring engine 38 may transmit the navigation directions to the client device 10. In other embodiments, the starting point scoring engine 38 transmits the one or more starting points and the destination to the navigation server 32, and the navigation server 32 generates and transmits the navigation directions to the client device 10.

The memory 37, or the memory in another server, can also store instructions for generating map data or for calling on the navigation server 32 to generate navigation directions.

More generally, the client device 10 can communicate with any number of suitable servers. For example, in another embodiment, a suggestions server 34 generates suggestions based on partial user input, a traffic data server provides traffic updates along a route, a weather data server provides weather data and/or alerts, etc.

For simplicity, FIG. 1 illustrates the POI database 40 as only one instance of a database. However, the POI database 40 according to some implementations includes a group of one or more databases, each storing different information. In addition, FIG. 1 illustrates the map data server 36 as only one instance of a server. However, the map data server 36 according to some implementations include a group of one or more map data servers, each equipped with one or more processors and capable of operating independently of the other map data servers. Map data servers operating in such a group can process requests from the client device 10 individually (e.g., based on availability), in a distributed manner where one operation associated with processing a request is performed on one map data server while another operation associated with processing the same request is performed on another map data server, or according to any other suitable technique. For the purposes of this discussion, the term "map data" may refer to an individual map data server or to a group of two or more map data servers.

According to an example scenario, a user in Chicago planning a trip to San Francisco displays map content of portions of San Francisco on a client device. The user decides on a few destinations within San Francisco but is not sure where she is likely to start from. However, the user would like to receive navigation directions and has an idea of the general area where the user will be during the trip.

Figure 2A:
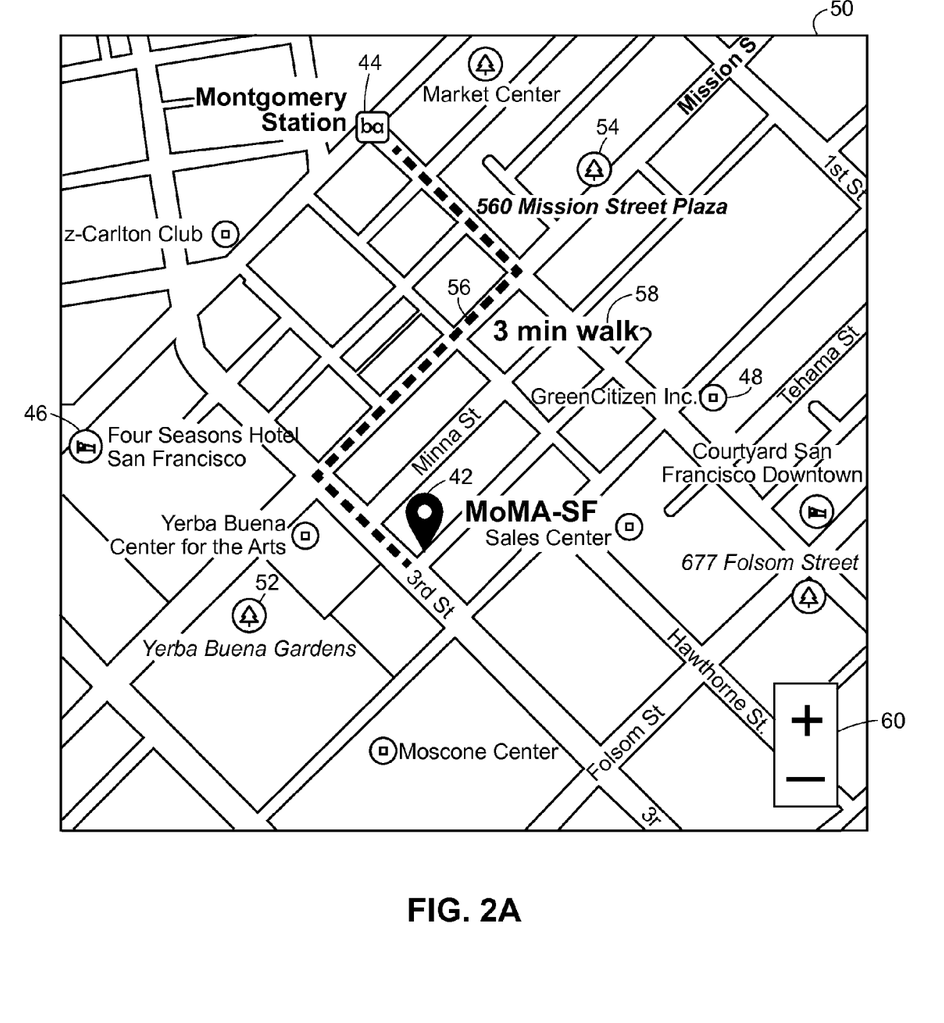
FIG. 2A is an exemplary display of map content and navigation directions for a destination at a first viewport.
Figure 2B:
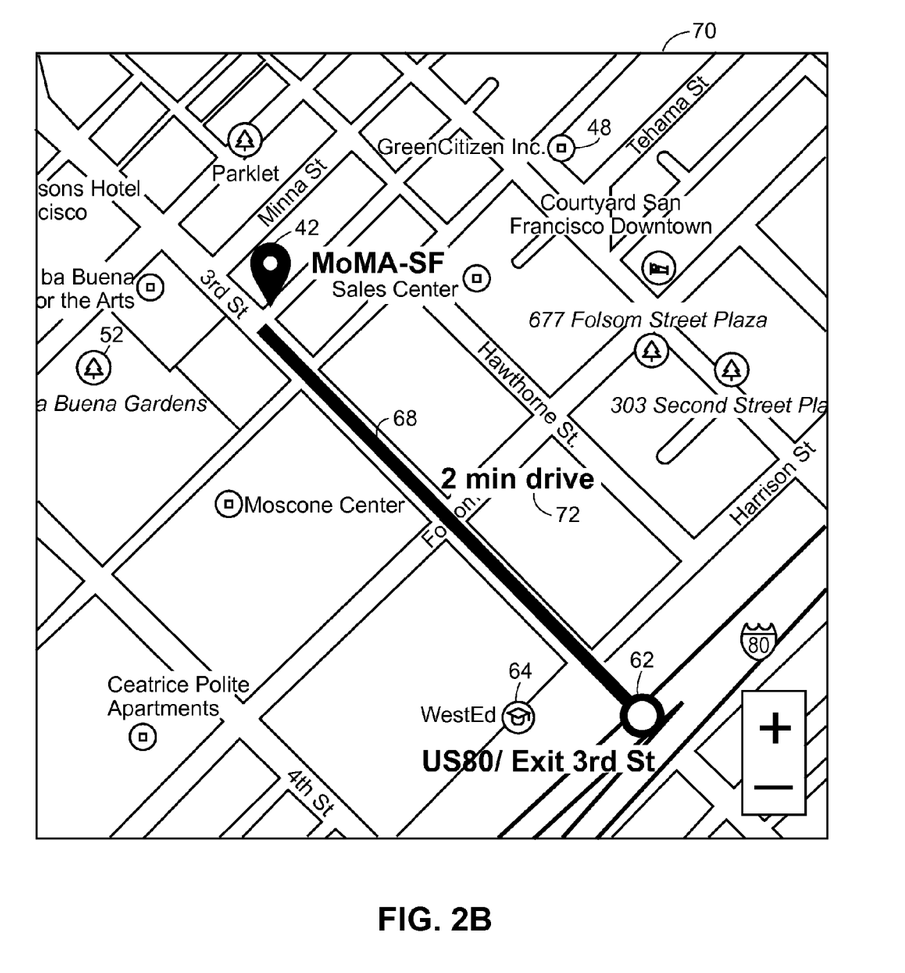
FIG. 2B is an exemplary display of map content and navigation directions for the same destination as in FIG. 2A at a second viewport.
Figure 2C:
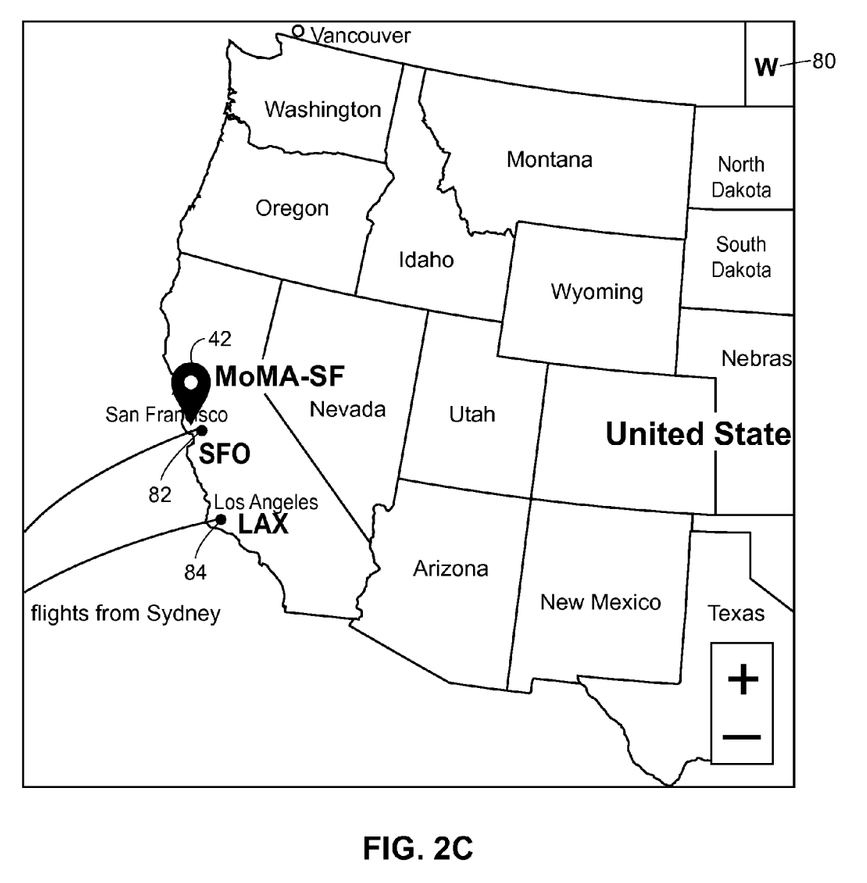
FIG. 2C is an exemplary display of map content and navigation directions for the same destination as in FIGS. 2A and 2B at a third viewport.

Before navigation directions to a destination are displayed, a client device 10 displays map content within a viewport selected by the user. FIGS. 2A, 2B and 2C illustrate example map content and navigation directions for a destination at three different viewports which are displayed on the client device. The destination is generally selected by the user, and can be selected in a variety of ways. For example, with reference to FIG. 1, when a user views map content on the client device 10, the user may click on a geographic location on the map which is automatically designated as the destination, via a mouse of a computer, a trackpad of a laptop, or a touchscreen of a mobile device. Alternatively, a user may enter the name or address of a geographic location into a destination field displayed on the map, via a software keyboard or an external keyboard. The user may also be prompted to click on or touch a destination or the user may not have to select a destination at all. Instead, for example, when a user selects a retail website, the website may include the location of the retailer as the destination on the website. In yet another example scenario, the user submits a geographic query, and the destination is automatically displayed on a digital map (the map viewport also can be automatically selected in this scenario). However, these are merely examples and the destination can be selected in any number of ways.

In any event, after the destination is selected, geographic locations within the viewport are identified for determining one or more starting points. With reference to FIG. 2A, the viewport includes the entire geographic area 50 at the particular zoom level displayed on the client device 10. The display includes a zoom button 60 to zoom in and out of the geographic area. In addition, a user may zoom by double clicking via a mouse on a part of the map, or in the case of a touchscreen the user can zoom by double tapping or pinching. Moreover, a user may also pan the display to view additional geographic locations. The user can pan by clicking and dragging, scrolling, flicking, etc.

In the example of FIG. 2A, the Museum of Modern Art in San Francisco (MoMA-SF) 42 has been selected as the destination and is demarcated by an ice-cream cone shaped tag. Within the viewport 50 of FIG. 2A, geographic locations are identified for determining one or more starting points. For example, the Montgomery Station 44, the Four Seasons Hotel San Francisco 46, GreenCitizen Inc. 48, Yerba Buena Gardens 52, etc., are geographic locations within the viewport 48 which may be ranked to determine one or more starting points for generating navigation directions. After the geographic locations are identified, the starting point scoring engine 38 (as shown in FIG. 1) determines the likelihood that each geographic location will be a starting point for the user.

To determine the likelihood, the starting point scoring engine 38 takes into account the zoom level of the viewport 50. When a viewport is zoomed in at a high level, the starting point scoring engine assumes the user will be in a very specific part of town and is likely to start at attractions, POIs, roads, transportation hubs, etc., within that specific part of town. On the other hand, if the viewport is zoomed out the starting point scoring engine 38 assumes the user may be starting from a much farther location. Therefore, major highways or even airports may be more likely to be the starting point for the user.

The starting point scoring engine 38 also factors in the popularity of the geographic locations. This can be determined by, for example, the number of people who "checked in" to a particular location using a social networking site. Additionally, popularity can be determined by identifying whether the geographic location is a historical landmark, or a well-known tourist attraction. Moreover, the time of year and time of day may also affect the popularity of a geographic location. For example, Wrigley Field may rank much higher in popularity during the summer than during the winter.

Accessibility to the geographic location can be another factor for determining the likelihood that a geographic location will be a starting point for a user. Accessibility is associated with the likely mode of transportation to the geographic location. For example, an airport is less accessible than a highway exit, because an airport most likely requires a plane whereas a highway exit most likely requires a car. Further to this point, a public transportation hub such as a train station is more accessible than a highway exit, because anyone can use public transportation. Also, the distance from the geographic location to the destination can be used to determine the likelihood the geographic location will be a starting point. However, this is not an exclusive list, and any number of factors may be used in determining the likelihood that a geographic location will be a starting point for a user.

Each factor may receive a score and the scores for the factors may be added up to determine an aggregate score. The aggregate scores for each geographic location may be compared in order to rank the geographic locations. In other embodiments, the geographic locations may be ranked according to each factor, and then ranked again based on their average ranking over the several factors. However, the geographic locations may be ranked in any number of ways.

Turning back to the example of FIG. 2A, Montgomery Station 44 is the highest ranking location of the geographic locations in the viewport 50, and as a result, Montgomery Station 44 is an starting point for navigation directions. This may be because Montgomery Station is a transportation hub so it is easily accessible. Montgomery Station may also be a very popular train stop. In any event, once the starting point scoring engine 38 determines an starting point, navigation directions 56 are generated from the starting point to the destination. As shown in FIG. 2A, the directions include an indication of the length of time to arrive at the destination based on the mode of transportation 58.

For the navigation server 32 (as shown in FIG. 1) to generate directions, in addition to an starting point and a destination the navigation server 32 may also receive an indication of a mode of transportation. A user may select a mode of transportation on the viewport 50 by selecting a button for walking, driving, public transportation or bicycling (not shown). Alternatively, the starting point scoring engine 38 may determine a likely mode of transportation based on the starting point and other factors. For example, the likely mode of transportation from Montgomery Station 44 to the Museum of Modern Art 42 may be walking because a user most likely exits the train at Montgomery Station 44 since Montgomery Station 44 is the closest train or bus stop to the Museum of Modern Art 42. Also, the distance from Montgomery Station 44 to the Museum of Modern Art 42 is very short so walking is likely. On the other hand, if the starting point is a highway exit, the mode of transportation is much more likely to be driving than walking, bicycling or taking public transportation. Therefore, the navigation server 32 receives a request to generate walking directions from Montgomery Station 44 to the Museum of Modern Art 42, and the directions 56 are displayed on the viewport 50.

Turning now to FIG. 2B, the viewport 70 indicates the user has not changed the destination and the zoom level is the same, but the user has panned southeast. When the user pans or changes the zoom level on the map, in addition to determining one or more starting points and providing navigation directions, the map data server 36 (as shown in FIG. 1) generates map data for the new viewport and transmits the map data to the client device 10. In the example viewport 70 of FIG. 2B, Montgomery Station is no longer within the viewport 70. While some geographic locations from the viewport 50 of FIG. 2A are still present such as GreenCitizen Inc. 48 and Yerba Buena Gardens 52, there are also many new locations such as US Highway 80 Exit 3rd Street 62, WestEd 64 and Ceatrice Polite Apartments 66. In this example, US Highway 80 Exit 3rd Street 62 is determined as the most likely starting point for a user. This may be because of the popularity of Highway 80, and because Exit 3rd Street is the closest highway exit to the Museum of Modern Art 42. As a result, driving directions 72 are displayed from US Highway 80 Exit 3rd Street 62 to the Museum of Modern Art 42.

FIG. 2C illustrates an exemplary display of map content and navigation directions for the same destination 42 as in FIGS. 2A and 2B at a third viewport 80. In this viewport 80, it appears the user has zoomed out substantially from the viewports 50 and 70. As a result, the map data server 36 (as shown in FIG. 1) generates map data for the new viewport and transmits the map data to the client device 10. Because the viewport is at such a low zoom level, the only geographic locations displayed are international airports, such as San Francisco International Airport (SFO) 82 and Los Angeles International Airport (LAX) 84. In this situation, a user is likely to be looking at a geographic location from another part of the country or another country and therefore airports are much more likely to be the user's starting point.

Because SFO 82 is much closer to the Museum of Modern Art 42 than LAX 84, the starting point scoring engine 38 may determine SFO 82 is the starting point and request navigation directions from SFO 82 to the Museum of Modern Art 42. If the user does not select a mode of transportation, the starting point scoring engine may determine the likely mode of transportation is driving or public transportation and provide either driving or public transportation directions to the Museum of Modern Art 42.

In each of the examples of FIGS. 2A-2C, only one starting point is determined and directions are displayed from one starting point to a destination. However, as mentioned above several starting points may be determined and directions may be displayed from several starting points. The several starting points may be determined by selecting geographic locations in descending order of their ranking until a specified number of starting points are selected. The number of starting points may be specified by the user by toggling a setting on the mapping application 22 (as shown in FIG. 1) of the client device 10. Alternatively, a default number of starting points may be specified.

Figure 3:
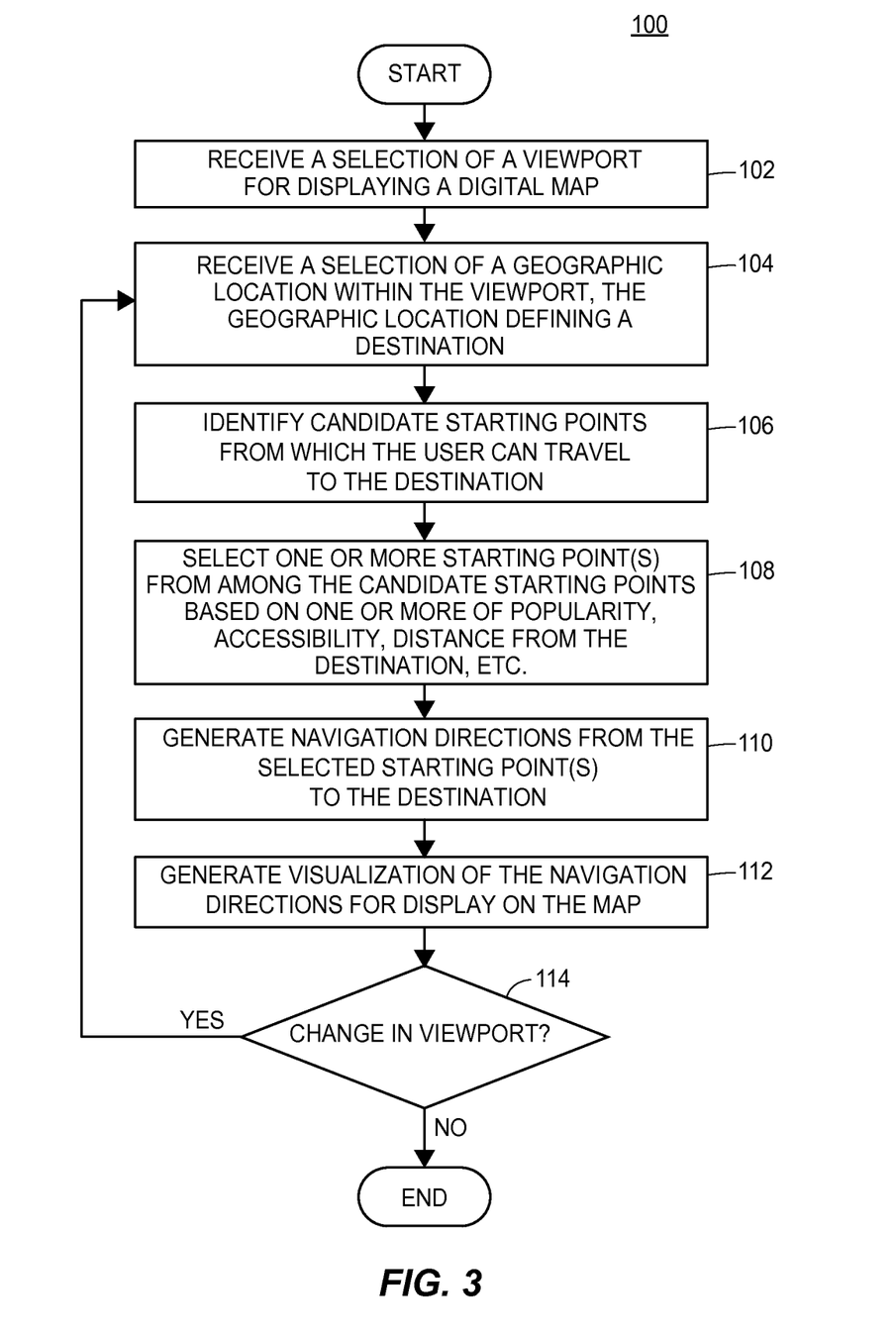
FIG. 3 is a flow diagram of an example method for providing navigation directions without specifying an starting point at the map data server.

FIG. 3 illustrates an example method 100 for providing navigation directions without specifying a starting point, which can be implemented at a network server (such as the map data server 36 of FIG. 1), for example. The method 100 in other implementations can be implemented on a client device (such as the device 10 of FIG. 1), or partially implemented in a network server and partially in a client device. The method 100 can be executed using processing hardware such as one or more processors that execute instructions stored on a computer-readable medium, for example.

At block 102, a selection of a map viewport for displaying a digital map is received. The map viewport can be described, for example, by the geographic coordinates of the locations at the four corners of the map viewport. As discussed above, a user can select the map viewport manually or automatically by submitting a search query, visiting a web site that embeds a digital map, etc.

At block 104, a selection geographic location within the map viewport, corresponding to a destination, is received. It is noted that a selection of a starting point is not received from a user according to the method 100. Then, one or more candidate starting points within the map viewport are identified (block 106). These candidate starting points in general are geographic locations which people are more likely to access the geographic location than from other locations within the map viewport. These candidate starting points need not be selected in view of the profile of the user: for example, transportation hubs, POIs (e.g., the Mozart monument), etc. can be selected.

Next, one or more starting points are selected from among the candidate starting points based on the popularity, accessibility, distance from the destination, etc., of the corresponding geographic location (block 108). Navigation directions from the one or more selected starting points to the destination then are generated (block 110). If block 110 is implemented in a network server, these navigation directions can be provided to the client device. A visualization is generated for the navigation directions at block 112. In general, visualization can be text-based or graphics-based, and can be provided as part of the digital map or separately.

If a change in the map viewport is detected at block 114, the flow returns to block 104, so that execution of blocks 104-112 can be repeated. If the viewport still includes the previously selected geographic location, block 104 need not be re-executed, and new candidate starting points, navigation directions, etc. can be generated. However, if the viewport no longer includes the previously selected geographic location, a new geographic selection can be selected, each of blocks 104-112 can be executed. If it is determined at block 114 that the user has not zoomed or panned, the method 100 completes.

Figure 4:
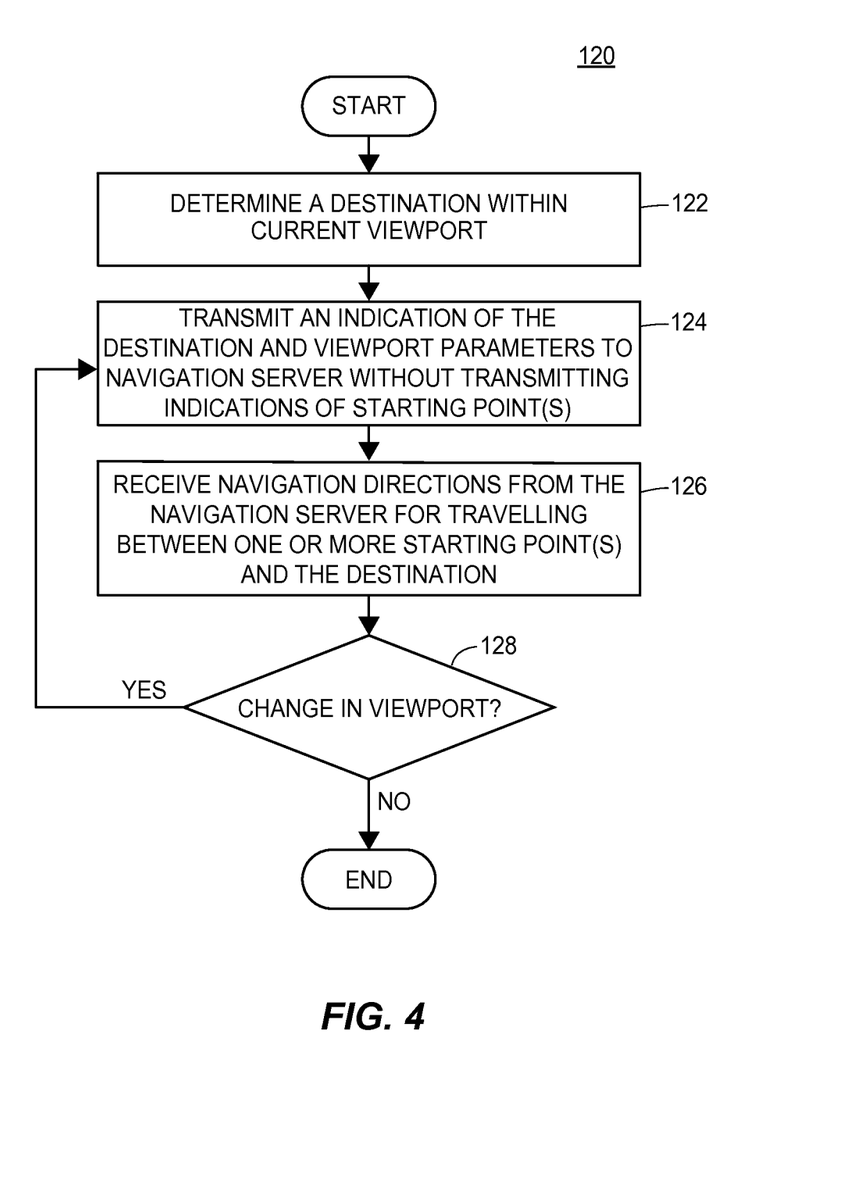
FIG. 4 is a flow diagram of an example method for receiving navigation directions without specifying a starting point at the client computing device.

FIG. 4 illustrates an example method 120 for receiving navigation directions without specifying an starting point, which can be implemented in the client device 10 or a similar device. Similar to the method 100, the method 120 can be implemented as instructions stored on a computer-readable medium and executable on one or more processors.

At block 122, the client device determines a geographic location corresponding to a destination for navigation directions. As mentioned above, the geographic location can be selected by the user or can be automatically selected at the client device. Subsequently, the client device automatically transmits a request for navigation directions, without specifying an starting point, for the viewport displayed on the client device (block 124). The request can include an indication of a geographic location defining the destination and an indication of the map viewport. In response, the client device receives navigation directions from one or more starting points to the destination (block 126). If the user zooms or pans after receiving directions (block 128), the flow returns to block 124, and client device transmits a request for navigation directions from the new viewport and the process is repeated. Otherwise, the process ends.

ADDITIONAL CONSIDERATIONS

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing navigation directions to a user without receiving a selection of starting points through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing navigation directions in mapping applications, the method comprising:
   receiving, at one or more computing devices, an indication of a geographic location, wherein the geographic location is a destination location;
   receiving, at the one or more computing devices, an indication of a map viewport from a user device that includes the geographic location;
   identifying, within the map viewport, a plurality of candidate starting points from which people are more likely to access the geographic location than from other locations within the map viewport, by the one or more computing devices;
   selecting a starting point from among the plurality of candidate starting points;
   generating navigation directions for guiding a user of the user device from the starting point toward the geographic location, for display on the user device.

2. The method of claim 1, wherein identifying the plurality of candidate starting points includes identifying, by the one or more computing devices, one or more of (i) a transportation hub, (ii) a point of interest, or (iii) an exit from a major road.

3. The method of claim 1, wherein selecting the starting point from among the plurality of candidate starting points includes ranking, by the one or more computing devices, the plurality of candidate starting points based on one or more of (i) popularity, (ii) an accessibility score, and (iii) distance to the geographic location.

4. The method of claim 3, wherein ranking the plurality of candidate starting points includes assigning a higher accessibility score to a starting point when the starting point is accessible by public transport than when the starting point is accessible by car only.

5. The method of claim 1, wherein generating the navigation directions includes automatically determining, by the one or more computing devices, a mode of transportation for a user.

6. The method of claim 1, further comprising:
receiving an indication that the user repositioned the map viewport, wherein the repositioned map viewport still includes the geographic location; and
in response to the received indication:
automatically identifying a new plurality of candidate starting points,
selecting a new starting point from among the new plurality of candidate starting points,
generating new navigation directions for guiding the user from the new starting point toward the geographic location and
generating a new visualization of the new navigation directions for display on the user device.

7. The method of claim 1, wherein the identifying the plurality of candidate starting points is independent of a profile of the user of the user device.

8. The method of claim 1, including receiving the indication of a geographic location and the indication of the map viewport from a third-party web site that embeds a digital map including the geographic location.

9. The method of claim 1, including receiving the indication of a geographic location and the indication of the map viewport in response to a geographic query submitted by the user of the user device.

10. A method in a client device for automatically receiving navigation directions, the method comprising:
displaying a digital map within a current map viewport via a user interface;
determining, by one or more processors, a geographic location within the current map viewport;
transmitting, by the one or more processors, an indication of the geographic location and an indication of the current map viewport to a network server via a communication network, wherein the geographic location is a destination location;
receiving, at the one or more processors from the network server, (i) an indication of a starting point within the viewport, automatically selected by the network server as a place from which users are more likely to access the geographic location, and (ii) navigation directions for traveling from the starting point toward the geographic location; and
providing a visualization of the navigation direction via the user interface.

11. The method of claim 10, wherein the starting point is selected independently of a profile of a user of the client device.

12. The method of claim 10, wherein the starting point is one of (i) a transportation hub, (ii) a point of interest, or (iii) an exit from a major road.

13. The method of claim 10, wherein the starting point is selected further in view of on one or more of (i) popularity, (ii) an accessibility score, and (iii) distance to the geographic location.

14. The method of claim 10, wherein determining the geographic location includes receiving the geographic location from a third-party web content server that embeds the digital map in a web site.

15. The method of claim 10, wherein determining the geographic location within the current map viewport includes receiving a result of a geographic query, wherein the result specifies the geographic location.

16. A client device comprising:
a communication interface;
a user interface;
a one or more processors coupled to the communication interface and the user interface;
a non-transitory computer-readable memory coupled to the one or more processors and storing thereon instructions that, when executed by the one or more processors, cause the client device to:
display a digital map within a current map viewport via the user interface;
receive a selection of a geographic location within the current map viewport;
transmit an indication of the geographic location and an indication of the current map viewport to a network server via the communication interface, wherein the geographic location is a destination location;
receive, from the network server, (i) an indication of a starting point within the viewport, automatically selected by the network server as a place from which users are more likely to access the geographic location, and (ii) navigation directions for traveling from the starting point toward the geographic location; and
provide a visualization of the navigation direction via the user interface.

17. The client device of claim 16, wherein the starting point is selected independently of a profile of a user of the client device.

18. The client device of claim 16, wherein the starting point is one of (i) a transportation hub, (ii) a point of interest, or (iii) an exit from a major road.

19. The client device of claim 16, wherein the starting point is selected further in view of on one or more of (i) popularity, (ii) an accessibility score, and (iii) distance to the geographic location.

20. The client device of claim 16, wherein to receive a selection of a geographic location within the current map viewport, the instructions cause the client device to receive the geographic location from a third-party web content server that embeds the digital map in a web site.

* * * * *